United States Patent [19]
von Stein

[11] Patent Number: 4,967,074
[45] Date of Patent: Oct. 30, 1990

[54] SCANNER FOR THE DETECTION OF BAR CODES ON ARTICLES

[75] Inventor: Walter von Stein, Waldkirch, Fed. Rep. of Germany

[73] Assignee: Erwin Sick GmbH Optik-Elektronik, Waldkirch, Fed. Rep. of Germany

[21] Appl. No.: 234,711

[22] Filed: Aug. 19, 1988

[30] Foreign Application Priority Data

Aug. 24, 1987 [DE] Fed. Rep. of Germany ....... 3728211

[51] Int. Cl.$^5$ .............................................. H01J 3/14
[52] U.S. Cl. .................................... 250/236; 250/568; 235/467
[58] Field of Search ....................... 235/467, 470, 462; 250/566, 568, 235, 236; 350/6.7, 6.8

[56] References Cited

U.S. PATENT DOCUMENTS

| | | | |
|---|---|---|---|
| 4,059,225 | 11/1977 | Maddox | 235/467 |
| 4,097,729 | 6/1978 | Seligman et al. | 250/568 |
| 4,560,862 | 12/1985 | Eastman et al. | 235/467 |
| 4,650,997 | 3/1987 | Yawn et al. | 350/6.7 |

*Primary Examiner*—David C. Nelms

*Attorney, Agent, or Firm*—Townsend and Townsend

[57] ABSTRACT

The scanner has a light transmitter (10) which radiates light onto a rotating mirror (12) for linewise scanning of an article (20). The mirror wheel (12) has mirror surfaces (1, 2, 3, 4, 5, 6) with different inclinations relative to its axis of rotation which project the light in parallel scanning lines onto the article (18). The light scattered back from the article (20) is picked-up by an optical system and transferred to a photodetector (30). The output signal of the photodetector (30) is stored after analogy-digital conversion in a memory (1", 2", 3", 4", 5", 6"). A pre-evaluation stage with a programmable module (32) accesses the memory (1", 2", 3-, 4", 5-, 6"), identifies the signal component originating frOm a bar code and transfers it to a second memory (38) which has a substantially smaller memory width but however a substantially larger memory depth. Here single components which are obtained in a plurality of scanning periods and which originate from bar codes are available for an analysis of the code information, which does not necessarily have to be effected synchronously with the scanning.

16 Claims, 1 Drawing Sheet

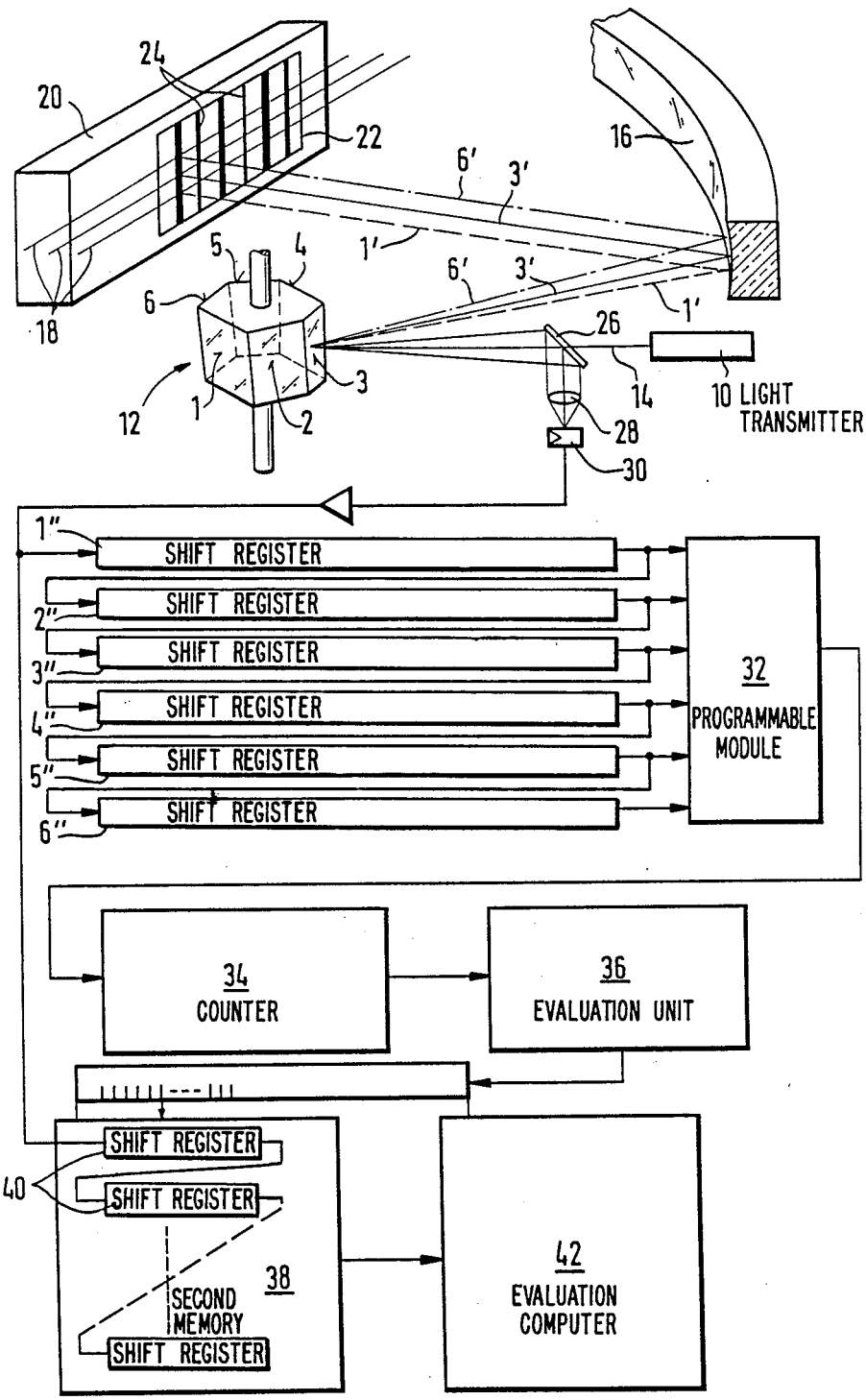

SCANNER FOR THE DETECTION OF BAR CODES ON ARTICLES

The invention relates to a scanner for the detection of bar codes on articles, the scanner comprising a light transmitter which radiates light onto a rotating mirror wheel for the linewise scanning of the article, an optical system which picks up the light scattered back by the article and transfers it to a photodetector, and an electronic processing unit which processes the output signal of the photodetector.

In scanners of this kind the output signal of the photodetector is processed in the prior art synchronously with the scanning movement of the light bead. Having regard to the large scanning width and the high scanning frequencies which are aimed for a flood of data occurs which can only be coped with using rapid and correspondingly expensive computers.

As the bar code field as a rule takes up a small part of the scanning width much non-useful information is expensively evaluated and valuable storage and computing capacity is blocked, whereas only inadequate possibilities exist for intensive evaluation of the actual signal region of interest.

The object of the invention is to provide a scanner of the named kind with which large scanning widths and high scanning frequencies can be achieved with an inexpensive and non-complicated construction, in particular of the electronic evaluation circuit.

This object is satisfied, in a scanner of the named kind, in that the mirror wheel has mirror surfaces of different inclination relative to its axis of rotation which project the light onto the article in parallel scanning lines.

Provision is expediently made for a memory to be present in which the output signal of the photodetector is stored, and for a pre-evaluation stage which accesses the memory to belong to the electronic evaluation circuit, with the pre-evaluation stage identifying the signal component originating from a bar code detected by each scanning lines having regard to the signals stored for several scanning lines, and passing it on for further signal processing.

The invention makes it possible to pick out the signal component which originates from a bar code detected by the scanner using an inexpensive and rapid pre-evaluation which is reliable against errors and to subject only this signal components to further evaluation to analyse the code information. The flood of data to be coped with is thereby substantially reduced, and the use of a comparatively slow and accordingly favourably priced computer is possible. Compared with scanners in accordance with the prior art the scan rate can be straightforwardly increased by a factor of 10 for the same computing power.

The mirror wheel is preferably a regular polygon and all its mirror surfaces are differentially inclined with respect to the axis of rotation so that the number of scanning lines corresponds to the number of the polygon mirrors. With this construction a scan period is executed with scanning processes along all the parallel scanning lines during each full rotation of the mirror wheel. This makes the time control for signal pick-up and signal storage particularly simple, in particular the mirror wheel can be connected to an inexpensive clock signal generator.

The spacing of the two outermost scanning lines should amount to a quarter and less of the bar code length. In this way one has such a broad range of tolerance within which all scanning lines come to lie on a bar code which is to be read out that one obtains significant data for the pre-evaluation.

A slow rotation of the scanning direction can be superimposed on the linewise scan. The rotation which can be brought about with customary optical means should be so slow that it does not notably have any effect during one scanning period. In this way a scanner is realised for the omnidirectional detection of bar codes.

The output signal of the photodetector is an analog signal and the memory is preferably a digital memory. It will however be understood that the output signal of the photodetector is subjected to analog-digital conversion before it is stored in the memory. The stored signal can in particular be a 1 bit light-dark signal. The requirement for storage locations is then minimal and the memory organisation is extremely simple. One can however also store multi bit signals which discriminate brightness stages, in particular an 8 bit signal, which one obtains by sending the output signal of the photodetector through an analog-digital convertor with a corresponding number of switching thresholds. The requirement for memory locations and the computing effort in further processing a signal of this kind are admittedly higher, however the resolution of the scan is considerably improved. This is important when undesired changes in sharpness are present or when the desired depth of focus of the scanner is to be increased with desired changes in the depth of field; for example when the focus lies in different focal planes and the optimum plane of focus is to be found.

The memory should have at least five storage locations for the smallest code bar width to be solved. In this way a good resolution is obtained for a low storage location requirement.

The memory can be built-up from interconnected shift registers. On storing 1 bit bright-dark signals it is recommended to provide one shift register for each scanning line whereas, when storing several bit signals per scanning line a set of a corresponding plurality of shift registers can be provided. The storage construction and the storage organisation are in this way particularly simple to realise in each case.

The pre-evaluation stage can contain one or more programmable modules. This makes programmable and correspondingly variable pre-evaluation possible, for example pre-evaluation in which bar codes can be distinguished from the back scattering surrounding them even in an inclined position. The location of the bar code within the back scatter can be precisely deduced thanks to the presence of several scanning lines.

In a preferred constructional form the scanner of the invention has a second memory into which the signal component identified as originating from a bar code can be transferred out of the first memory. The second memory then takes over the cleaned up signal component, which is solely relevant for code detection, for effective further processing.

The capacity of the first memory is preferably dimensioned in accordance with the full scanning width and the number of scanning lines so that it can just pick-up the signals obtained during one scanning period. The capacity of the second memory is in contrast preferably laid out in accordance with the customary length of the bar code field, which can be substantially smaller than the scanning width, and for a multiple of the number of scanning lines, for example 20 to 100 times this number, so that signal components obtained in a corresponding number of scanning periods and identified as originating from a bar code can be transferred into the second memory. Thus the relevant signal component obtained in a large number of scanning periods is available in the second memory for further processing. In this way an analysis of the code information is possible with a high degree of reliability, and indeed for a comparatively low computing effort, since the data quantity which has to be coped with as a whole is still always small.

The second memory can also be built-up of interconnected shift registers. The length of the shift register is, in this arrangement, preferably matched to the signal component coming from a bar code. In the case of 1 bit signals one shift register is provided for each signal component and for multi-bit signals a set of a corresponding number of shift registers is provided for each signal component. The memory construction and organisation are particularly simple with this embodiment.

The second memory should have the same number of storage locations as the first memory for the smallest code bar width to be resolved. Thus signal transfer between the memories is ensured with a simple memory construction and without loss of information.

The electronic processing circuit accesses the second memory for the further evaluation in which the bar code information is analysed. The electronic processing circuit can contain at least one evaluation computer which does not necessarily read out signals from the second memory synchronously with the scanning frequency of the scanner. The working cycle of the evaluation computer is thus independent of the scanning frequency of the scanner. In this way one has in particular much time available for the evaluation after one bar code has been scanned before the next bar code enters into the scanning range of the scanner.

The evaluation computer can be correspondingly slow and favourably priced.

If bar codes are to be scanned in rapid sequence one after the other then several parallel evaluation computers can access the second memory to increase the evaluation power, with the computers operating in accordance with a time-sharing process. Since one makes do now, as previously, with relatively slow evaluation computers the additional complexity is comparatively small. In order to process the stored data it is in turn very advantageous for the working cycle of the exploitation computers to be determined independently of the scanning frequency of the scanner.

The invention will now be described more closely in the following with reference to an embodiment shown in the drawing.

BRIEF DESCRIPTION OF DRAWING The sole FIGURE schematically shows parts of the optical system and of the electronic processing circuit of a scanner for detecting bar codes.

A light transmitter 10, for example a laser, radiates light onto a rotating mirror wheel 12. The mirror wheel 12 has, in the illustrated embodiment, a hexagonal basic outline and six planar mirror surfaces 1, 2, 3, 4, 5, 6 at its outer surface. The mirror surfaces 1, 2, 3, 4, 5, 6 are inclined at different angles to the axis of rotation of the mirror wheel 12. A different deflection thus occurs depending on which mirror surface 1, 2, 3, 4, 5, 6 is struck by the transmitted light beam 14. This is illustrated in the drawing by way of example, with reference to the light rays 1', 3', 6' which are reflected from the mirror surfaces 1, 3, 6. It is only the principal axes of the transmitted and receiving beams from the polygonal surfaces which are shown, with the beam 1 being located at the bottom, the beam 3 at the center and the beam 6 at the top.

The light reflected from the mirror wheel 12 is projected by various optical elements, which are not shown in more detail, onto a concave mirror 16 which deflects the light beam linewise with a parallel beam path on rotation of the mirror wheel 12. The light coming from the various mirror surfaces 1, 2, 3, 4, 5, 6 is thereby projected in parallel scanning lines 18 onto an article 20 to be scanned. Article 20 carries a bar code field 22 with a number of code bars 24 of different thickness. In order to read out the bar code the scanning lines 18 should extend substantially perpendicular to the code bars 24. This can be achieved by fixed geometrical parameters.

It is however also possible to superimpose a slow rotation of the scanning direction of a linewise scan. As a result of the slow rotation of the scanning direction the scanning lines will come at some stage during a code read-out process into the desired position orientated substantially perpendicular to the code bars 24 whereupon the bar code is recognised and read out. The parallel scanning lines 18 at lie approximately the same spacing in a band, the width of which amounts to approximately one quarter of the code bar length.

The article 20 scatters the incident light substantially back on itself. The light passes via the concave mirror 16 and the mirror wheel 12 to a beam divider 20 where it is coupled out. The beam divider 26 can be formed by a semi-permeable mirror which lies at an angle of 45° in the transmitted light beam 14. The reflected light scattered by the article 20 and coupled out by the beam divider 26 is projected via a suitable image forming optical system 28 onto a photodetector 30, with only the edge beams of the scattered light being drawn in shortly before the beam divider 26 up to the photodetector 30 for the sake of clarity. At the output of the photodetector 30 there then appears an electrical analog signal corresponding to the light intensity. This signal is subjected for further processing to analog-digital conversion. In a first variant one uses for this purpose an analog-digital converter which discriminates between bright and dark and transmits a 1 bit signal. As an alternative one can however also use an analog-digital converter with a plurality of switching thresholds which respectively correspond to brightness steps. At the output of such an analog-digital converter one then obtains a multi-bit signal, in particular an 8 bit signal which identifies the particular brightness stage which is present.

In the following it is assumed, by way of example, that the scanner has a scanning width of 1000 mm. The time for scanning through this scanning width may be a few milliseconds, may however also only amount to fractions of a millisecond. The smallest code bar width to be detected is typically 0.5 mm. In order to reliably recognise bar widths of this order of magnitude one must scan with a resolution of approximately 0.1 mm. Thus, in the very short scanning period approximately 10,000 signals occur over the entire scanning width and the assumption will first be made that these are 1 bit signals.

The analog-digital converter arranged after the photodetector 30 is connected to a first digital store which is built-up in the illustrated embodiment of six shift registers 1'', 2'', 3'', 4'', 5'', 6''. For 1 bit signals each shift register thus has a capacity of 10.000 bit. It is thus also suitable for picking-up the signals which occur over a full scanning width. The shift registers 1'', 2'', 3'', 4'', 5'', 6'' are connected together so that the signal coming from the analog-digital converter is fed through. The first memory is occupied when the article 20 has been swept over with the available scanning lines 18. This is the case in one scanning period which is set in the illustrated embodiment by a full rotation of the mirror wheel 12. The shift registers 1'', 2'', 3'', 4'', 5'', 6''then each contain signals which have occurred on one of the scanning lines 18, i.e. on the formation of an image via one each of the mirror surfaces 1, 2, 3, 4, 5, 6 over the full scanning width. In the case of multi-bit signals sets of shift registers with each set comprising a plurality of parallel shift registers, should be provided for this purpose in place of individual shift registers, i.e. in the case of 8 bit signals, for example eight shift registers per set (not illustrated).

Bar code fields 22 have a typical length of approximately 50 mm. The remaining surface of the scanned article 20 is provided with a printed scattering background or the like which does not contain any information to be read out. Assuming that a bar code field 22 lies in the scanning range of the scanner, and that the scanning lines 18 have the desired orientation substantially transverse to the code bars 24, relevant information is only present in very small part in the first memory after one scanning period.

In accordance with the invention a rapid evaluation now takes place with which the information originating from a bar code is identified, is localised in the first memory and is picked-out for further signal processing. The pre-evaluation is carried out with a programmable module 32 which accesses the shift registers 1'', 2'', 3'', 4'', 5'', 6''. Lines of a bar code can be identified in as much as all the shift registers, or only some of them contain the same information at the address associated with the same scanning points. If one wishes to also detect bar codes in an inclined position one can also include a neighbouring range of the corresponding addresses in the pre-evaluation, which is readily possible by suitable programming of the programmable module 32. Signals originating from bar codes are characterised in that they form a block of coherent data in the shift registers. Random correspondence of the stored information at addresses associated with the same scanning position is thus not evaluated as a signal of the bar code in the pre-evaluation if it relates to an isolated position in the shift registers. This examination is preferably carried out with a counter 34 which is arranged after the programmable module 32. Not only the position and length of the signal component originating from a bar code, but rather also the angular position of the bar code relative to the scanning lines 18 can be identified from the memory addresses of the shift registers, or from a clock signal which shifts the information through the shift register and represents these memory addresses. For this purpose a further evaluation unit 36 which is arranged after the counter 34 is provided in the illustrated embodiment. With multi-bit signals the possibility exists of determining an ideal plane of sharpness and of correspondingly selecting the signals coming from this plane for further processing.

The signals originating from a bar code which are picked-out in accordance with the described criteria are transferred into a second memory 38 which has a substantially smaller storage width but a substantially larger storage depth than the first memory. The second memory 38 is built-up of interconnected shift registers 40, the capacity of which is laid out with respect to the quantity of information stemming from one bar code. In the case of 1 bit signals they are also be laid out to approximately 500 bit in the illustrated embodiment. This is however only a fraction of the capacity of the shift register 1'', 2'', 3'', 4'', 5'', 6'' used in the first memory which each pick-up the information stemming from a whole scanning line. 120 to 600 such shift registers 40 are however now provided in the second memory 38, i.e. a number which exceeds the number of scanning lines 18 by 20 to 100 times. In this way the signals which are obtained in the 20 to 100 scanning periods and which are identified as originating from a bar code can be stored in the second memory 38. The second memory 38 has the same number of storage locations for the smallest code bar width to be resolved as the first memory, so that the accuracy of the spatial resolution on changing memories is maintained. If, starting from multi-bit signals in the first memory multi-bit signals are also to be further processed then the second memory 38 can also consist of sets of parallel shift registers (not shown), the number of which corresponds to the prevailing bit number.

For the analysis of the content of the bar code information an evaluation computer 42 now accesses the second memory 38. This can take place fully independently of the scanning function of the scanner with its own clock frequency. The signal components which are obtained from the 20 to 100 scanning periods which originate from a bar code are available in isolation for the second stage of the evaluation. The analysis of the bar code information can thus be effected with a large date set and numerous test steps without requiring a complicated and rapid evaluation computer. If necessary, several evaluation computers can also be connected in parallel which access the second memory in a time-sharing process.

The invention is suitable for scanners with the most diverse beam paths. It can in particular also be used for scanners with telecentric beam path and also for V-scanners with diverging beam path.

I claim:

1. Scanner for the detection of bar codes on articles, the scanner comprising:
   a light transmitter for radiating light onto a rotating mirror wheel for the linewise scanning of an article, wherein the mirror wheel includes an axis of rotation and a plurality of mirror surfaces of different inclination relative to the axis of rotation, the surfaces for projecting the light onto the article in parallel scanning lines;
   an optical system for picking up the light scattered back by the article and transferring it to a photodetector; and
   an electronic processing unit which processes the output signal of the photodetector, said electronic processing unit comprising:
      a memory in which the output signal of the photodetector is stored;
      an electronic evaluation circuit including a programmable, fast, pre-evaluation stage for accessing the memory and identifying a signal component which originates from a bar code detected by the scanning lines with reference to the signal stored for several scanning lines by the memory containing the same information at addresses associated with the same scanning point or with adjacent scanning points;

means for picking the signal component out for further signal processing; and at least one slower evaluation computer for analyzing the bar code information.

2. Scanner in accordance with claim 1, wherein the mirror wheel is a regular polygon; and wherein the mirror surfaces are differentially inclined relative to the axis of rotation so that the number of the scanning lines corresponds to the number of the polygonal mirrors.

3. Scanner in accordance with claim 1, wherein the spacing of the two outermost scanning lines amounts to approximately one quarter of the code bar length.

4. Scanner in accordance with claim 1, wherein a slow rotation of the scanning direction is superimposed on the linewise scanning by optical means.

5. Scanner in accordance with claim 1, wherein the output signal of the photodetector is a 1 bit light-dark signal.

6. Scanner in accordance with claim 1, wherein the output signal of the photodetector is a multiple bit signal discriminating brightness stages.

7. Scanner in accordance with claim 6 wherein the output signal is an 8 bit signal.

8. Scanner in accordance with claim 1, wherein the memory has at least five storage locations for the smallest code bar width to be resolved.

9. Scanner in accordance with claim 1, wherein the memory is built up of interconnected shift registers with either one shift register or a set of shift registers being present for each scanning line.

10. Scanner in accordance with claim 1, comprising a second memory into which the signal component identified as originating from a bar code is transferable from the first memory.

11. Scanner in accordance with claim 10, wherein the capacity of the first memory is dimensioned in accordance with the full scanning width and the number of scanning lines, whereas the capacity of the second memory is laid out for the customary length of a bar code field, which can be substantially smaller than the scanning width and contains many times the number of scanning lines, so that signal components identified as originating from the bar code and obtained in a corresponding number of scanning periods can be transferred into the second memory.

12. Scanner in accordance with claim 11, wherein the capacity of the second memory is 20 to 100 times the number of scanning lines.

13. Scanner in accordance with claim 10, wherein the second memory is built up of interconnected shift registers, with one shift register or a set of shift registers being present for each signal component identified as originating from a bar code.

14. Scanner in accordance with claim 10, wherein the second memory has the same number of storage locations for the smallest code bar width to be resolved as the first memory.

15. Scanner in accordance with claim 10, wherein the evaluation computer read signals out of the second memory not necessarily synchronously with the scanning frequency of the scanner.

16. Scanner in accordance with claim 10, wherein the electronic evaluation circuit contains several evaluation computers in parallel which access the second memory in a time-sharing process.

* * * * *